Aug. 2, 1955
F. B. JENNINGS
2,714,310
MASS RATE FLOWMETER
Filed Dec. 6, 1951
2 Sheets-Sheet 1
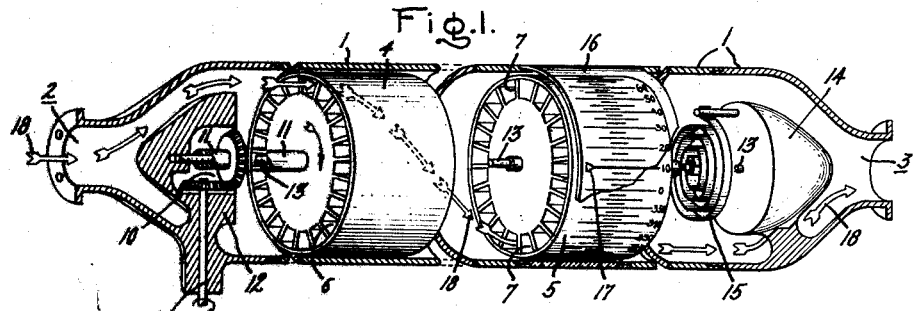
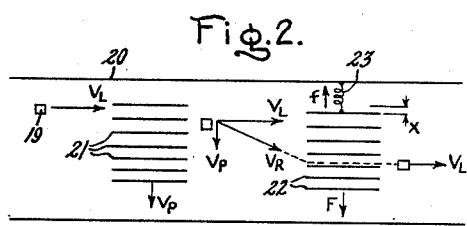
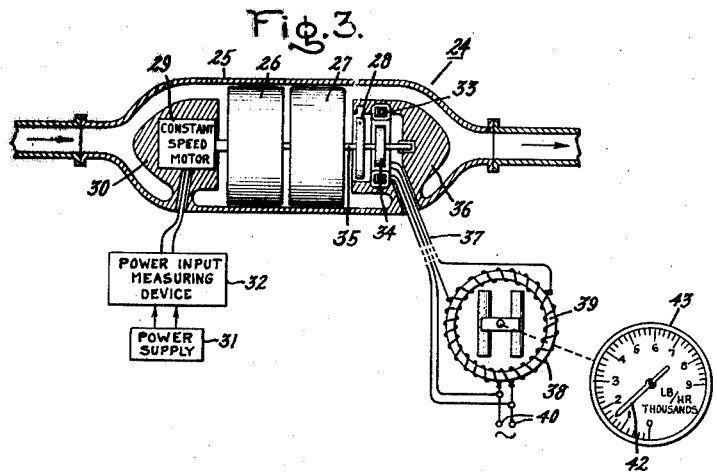
Inventor:
Frederic B. Jennings,
by Russell A. Warner
His Attorney.

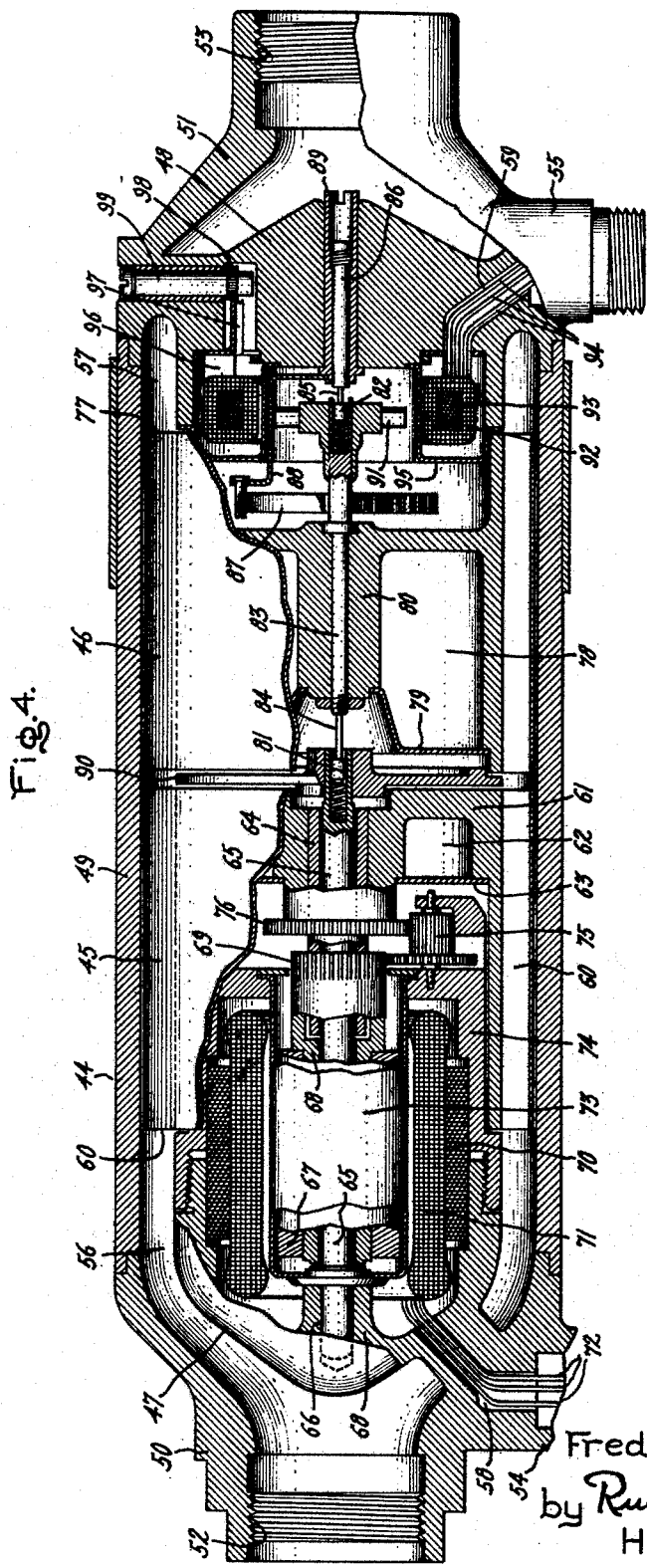

United States Patent Office 2,714,310
Patented Aug. 2, 1955

2,714,310

MASS RATE FLOWMETER

Frederic B. Jennings, Beverly, Mass., assignor to General Electric Company, a corporation of New York Application December 6, 1951, Serial No. 260,204

13 Claims. (Cl. 73—194)

The present invention relates to fluid flow measurement, and, more specifically, to improved apparatus for accomplishing the measurement of mass of fluid flow per unit of time.

Although it has long been appreciated by those skilled in the flowmeter art that the rate at which fluid mass is transferred is one of the most significant characteristics of the fluid flow in many types of systems, the successful measurement and indication of this characteristic, with simple and reliable equipment and with a satisfactory degree of accuracy and independence of other characteristics of the fluid flow, has heretofore remained unattained in accordance with conventional concepts. The measurement of volumetric flow of fuel to an aircraft engine, for example, is often unsatisfactory because fuel volume fluctuates with temperature, while measurement of fuel mass rate of flow is of important significance inasmuch as it bears a most useful relationship to fuel heat content, expected flight duration, and fuel loading of the craft. Information concerning mass rate of flow of fluids may be derived in several known ways, most commonly in systems responsive to differences in pressure in a fluid circuit occasioned by Venturi tubes, orifices, Pitot tubes, nozzles, or a cylinder rotating about an axis transverse to the direction of fluid flow; however these arrangements are primarily of laboratory or stationary installation types and do not possess the simplicity and ruggedness of construction, reliability of operation, and accuracy of indication under all conditions which are required for general purpose applications and particularly for the specific application to aircraft installations where perhaps the most severe operating conditions are encountered.

Mass per unit of time measurement of fluid flow has been extremely difficult because of the critical relationship between mass flow and the fluid density and viscosity, and because of the numerous factors causing variations in these characteristics. In prior mass rate flowmeters utilizing the known methods for securing some form of output signal responsive to the mass rate of fluid flow characteristic, the output signal is found to be erroneous because of its additional responsiveness to variations in fluid density and viscosity, whereupon appropriate modification of the signal by complex corrective equipment has been required to afford a meaningful output. As will appear more fully hereinafter, apparatus for achieving measurement of mass rate of fluid flow in accordance with the instant invention not only satisfy the aforementioned requirements but inherently provide the desired measurement with substantial independence of characteristics other than mass rate of flow, and without associated corrective systems.

Accordingly, one object of the present invention is to provide novel and improved flowmeter apparatus for the measurement and indication of mass of fluid flow per unit of time.

Another object is to provide an improved highly accurate mass rate flowmeter, the output of which is substantially independent of variations in the density and viscosity of the fluids under measurement.

Still further, it is an object to provide a high-accuracy mass rate flowmeter of simple construction which operates in any position in space, which has a minimum fluid pressure drop thereacross, and which has a substantially linear relationship between output signals and the mass rate of fluid flow.

By way of a summary account of one aspect of this invention, I provide a measurement of mass rate of fluid flow in a fluid circuit or path by angularly accelerating the fluid to a uniform velocity of motion about an axis parallel with the flow velocity direction, this imparted velocity preferably being a uniform rotational velocity, and by performing a measurement which is responsive to the momentum of the fluid as a consequence of the uniform velocity of motion imparted to it. In one embodiment of my invention, the uniform velocity of motion about the axis of flow is imparted to the fluid by an impeller driven at a substantially constant speed by a motive device, and the measurement made is of the deflection of a turbine device which is resiliently restrained and positioned such that it may be deflected from a null position by the fluid after the uniform velocity of motion has been imparted to it.

Although the features of this invention which are believed to be novel are set forth in the appended claims, the details of the invention itself and further objects and advantages thereof may be most readily comprehended by reference to the following description taken in connection with the accompanying drawings, wherein:

Fig. 1 illustrates, in a partly pictorial and partly sectionalized side view, one construction of a mass rate flowmeter in conformity with my invention;;

Fig. 2 is a diagrammatic analysis of the operation of the subject flowmeter;

Fig. 3 represents a mass rate flowmeter system providing remote indication of mass rate of flow of a fluid; and Fig. 4 is a partly-cut-away side view of a further and preferred embodiment of a mass rate flowmeter unit.

My apparatus for determining the mass rate of fluid flow in a flow circuit or path comprises an impeller which angularly accelerates the fluid to a uniform velocity of motion about an axis parallel to the flow direction, and a turbine which performs a measurement which is responsive to the momentum of the fluid after it has achieved this uniform velocity of motion. The turbine functions to reduce the uniform angular velocity of motion of the fluid about the axis of rotation and reduce this velocity to zero or to some finite velocity of motion.

One flowmeter arrangement for practicing this invention is shown in Fig. 1 of the drawings as comprising a generally cylindrical outer structure or housing 1 through which the metered fluid flows in a substantially axial direction from an upstream reduced opening 2, where the fluid is admitted to the structure, to a downstream reduced opening 3 which serves as the fluid exit. Within the housing 1 there is contained an impeller unit 4 and a turbine unit 5, both substantially cylindrical in outer configuration and proximately positioned end-to-end such that their longitudinal axes lie along the longitudinal axis of the surrounding structure 1. Impeller 4 and turbine 5 are of the same outer diameters, fitting closely within the inner cylindrical surfaces of the outer housing 1, and both having a number of equally-spaced longitudinal slots, 6 and 7 respectively, having openings only at the ends thereof, and positioned near the peripheries of the units 4 and 5 and at a fixed spaced radial distance from the longitudinal axes of these units. These slots are relatively thin in their radial dimensions and are wholly linear and parallel with these longitudinal axes. Impeller 4 is positioned nearer the upstream opening 2, and is rotated at a constant angular velocity by a constant speed motor 8. This rotation is accomplished through the motor shaft 9, gearing 10, and the hollow impeller shaft or sleeve bearing 11 upon which unit 4 is mounted. The upstream bracket 12, which is mounted on the outer housing structure 1 and which is streamlined to impart a minimum of turbulence to the fluid flow, supports and houses the shaft 9, gearing 10, and shaft 11. Turbine 5 is positioned nearer the downstream opening 3 on a sleeve bearing riding on the longitudinal shaft 13 which is provided with fixed support on the upstream bracket 12 and on a similarly-constructed downstream bracket 14. Angular motion of turbine 5 and its shaft is resiliently restrained by the spiral spring 15 attached at one end to the turbine sleeve bearing on shaft 13 and at the other end to the downstream bracket 14. A transparent section or window of glass or other suitable material, designated by numeral 16, is provided in the housing 1 opposite the turbine 5, and an index 17 on this window cooperates with graduations and indicia on the exterior of the turbine unit to indicate the angular movement of this unit and, hence, the mass rate of fluid flow, in a manner described hereinafter.

General operation of the mass rate flowmeter of Fig. 1 may be readily understood by referring to the arrows 18 which trace the path of a small unit mass of fluid, for example a liquid fuel, passing through the device. As these arrows illustrate, fluid entering the upstream opening 2 is caused to flow about the upstream bracket 12 until substantially all of the fluid reaches the thin longitudinal slots 6 of the impeller 4. This impeller 4 is rotated at a constant speed by the drive motor 8, and, to each of the unit masses of fluid entering the rotating slots 6 there is imparted the same uniform angular velocity of motion which, upon the fluid exit from the downstream end of these impeller slots, is substantially the same angular velocity as that of the impeller. Because the impeller slots 6 are radially thin and at the same radius or radial spacing from the impeller axis of rotation, all of the fluid passing therethrough must have substantially the same linear speed about the impeller axis, linear speed being equal to the angular speed multiplied by the radius. Thus, the fluid leaving the impeller slots has a predetermined uniform angular velocity which is perpendicular to its longitudinal or flow direction velocity caused by other means, such as a pumping system in the flow path, not shown. By introducing this angular velocity to the fluid, there is imparted to the fluid leaving the impeller a corresponding angular momentum, and, since the angular velocity is maintained at a constant predetermined value, this angular momentum is directly proportional to the mass of the fluid. As a unit mass of the fluid flows from the downstream opening of one of the impeller slots 6, it encounters the turbine 5, enters one of the turbine slots 7, and dissipates substantially all of its angular momentum against a side wall of the slot before its exit therefrom, such that there remains only the longitudinal or flow direction velocity when the fluid leaves the turbine and flows past the downstream bracket 14 and through the downstream opening 3. Turbine 5 and its attached sleeve bearing are angularly movable against the angular restraining force of the spiral spring 15, so that the torque exerted upon the turbine by the fluid angular momentum as it is dissipated against the sides of the turbine slots causes an angular deflection of the turbine limited by the spiral spring force. The turbine torque is equal to the rate at which the angular momentum of the fluid is dissipated, and the angular deflection of the turbine is, therefore, a measure of the mass rate of flow. Index 17 on window 16 is visually compared with graduations and indicia on the outer surface of turbine 5 to provide an indication of this measurement.

The schematic diagram of Fig. 2 assists in an analysis of the operation of the subject flowmeter through a presentation of the relationship between the forces acting in the unit. A unit volume of fluid 19 is illustrated as entering the flowmeter chamber 20 with a longitudinal or flow direction velocity $V_L$. The set of impeller vanes or slots 21 moved in a direction perpendicular to the longitudinal fluid flow and at a velocity $V_P$ create a component of velocity of the unit volume, $V_P$, which is perpendicular to the longitudinal velocity $V_L$. The unit volume of fluid which leaves the impeller vanes 21 thus has the resultant velocity $V_R$, and when the fluid strikes the turbine vanes and flows through the turbine slots 22, the velocity component $V_P$ is reduced to zero, whereupon the unit volume again has only the flow direction velocity $V_L$. The force F exerted upon the turbine vanes 22 is equal to the loss of perpendicular velocity $V_P$ (a constant, K), multiplied by the mass rate of flow into these vanes, $$\frac{dM}{dt}$$

thus $$F = V_P \frac{dM}{dt} = K \frac{dM}{dt}$$

A restraining spring 23 exerts an equal and opposite force, $f$, upon the turbine vanes, this force being equal to the spring constant, $k$, multiplied by the spring deflection, $x$;

$$f = kx$$

The turbine vane deflection $x$ (which is the same as that of the spring 23) is, therefore, proportional to the mass rate of flow:

$$x = \left(\frac{V_P}{k}\right)\frac{dM}{dt} = \frac{K}{k}\frac{dM}{dt}$$

Considering further the effects when a unit volume of fluid passes through a turbine, such as turbine 5 in Fig. 1, it is well known that such a rotating unit volume, upon leaving the impeller 4 has an angular momentum, $h$, which is equal to IW, where I is the moment of inertia and W is the angular velocity of the unit volume, that is:

$$h = IW$$

When this same unit volume has its angular velocity reduced to zero in its flow through the turbine 5, in an increment of time $dt$, its change in momentum has been:

$$\frac{dh}{dt} = \frac{WdI}{dt}$$

From Newton's laws relating to angular motion, it is established that the torque T applied to, or here applied by, a rotating mass, such as the unit volume under consideration, is equal to the rate of change of its angular momentum, IW:

$$T = \frac{d(WI)}{dt}$$

and under the above conditions:

$$T = \frac{WdI}{dt}$$

which is the torque applied to the turbine 5. Expressing the moment of inertia, I, in terms of the radius of gyration, R, and the mass, M, of the unit volume:

$$I = MR^2$$

or $$dI = R^2 dM$$

whereupon the torque becomes:

$$T = WR^2\frac{dM}{dt}$$

the term $$\frac{dM}{dt}$$

representing mass rate of flow. Since the terms W and R² are fixed by the flowmeter design, the torque applied to the turbine and measured by its angular deflection is a direct indication of this mass rate of flow.

In Fig. 3 there is illustrated a mass rate flowmeter 24 having a chamber 25 within which are positioned an impeller 26 and a turbine 27 restrained by a spiral spring 28, their construction and arrangement being similar to that for the corresponding elements of the flowmeter of Fig. 1. A constant speed motor 29, serving as the motive means for actuating the impeller 26, is housed within the upstream bracket 30 and supplied with excitation from the electrical power source 31. The power input measuring device 32, which measures the power required to preserve a constant speed of rotation of the motor 29 and impeller 26, may itself provide an indication of the mass rate of flow under some conditions, since the torque required to produce a constant angular velocity of the fluid is a measure of the mass rate of flow, and this torque is related to the power consumption. However, the measurement of turbine displacement is of greater accuracy for the measurement of mass rate of flow, particularly when varying fluid characteristics are encountered, and this measurement is most satisfactorily accomplished with an electrical telemetering arrangement which may include a remote indicator. Such an arrangement is shown to include an electrical pickoff having a stator winding and core structure 33 and a permanent magnet rotor 34 attached to the shaft 35 of turbine 27, supported by the downstream bracket 36. Leads 37 interconnect the stator winding of this pick-off with the stator winding 38 on the receiver or remote indicator unit core 39 at a plurality of points, and alternating current excitation to both windings is delivered through terminals 40. A permanent magnet rotor structure 41 at the receiver is angularly oriented in accordance with the transmitter magnet 34 and actuates the pointer 42 on an indicator dial structure 43 to indicate mass rate of fluid flow. It will be recognized that the telemetering pick-off and remote indicator illustrated are of the second harmonic type wherein second harmonic voltages characterizing the pick-off rotor orientations are generated in the pick-off winding and applied to the winding of the remote indicator where unidirectional diametric magnetic fluxes are established to cause the indicator rotor magnets to align themselves with these fluxes. Other types of telemetering arrangements may, of course, be utilized to produce comparable satisfactory output indications.

One detailed embodiment of a mass rate flow metering unit operating in accordance with the principles explained hereinbefore is depicted in a detailed side elevation in Fig. 4. It will be observed that this device, like those illustrated in Figs. 1 and 3, incorporates a generally-cylindrical outer housing structure 44, an impeller 45, a turbine 46, and streamlined upstream and downstream brackets 47 and 48 respectively. For constructional convenience, the outer housing structure 44 is comprised of three sections fixed together in a fluid-tight relationship, the central hollow cylindrical portion 49 being joined at the upstream end thereof with an end member 50 and at its downstream end with an end member 51. These end members, 50 and 51, are terminated by a suitable means, such as the threaded sections 52 and 53, for coupling the flowmeter unit with the conduits (not shown) carrying a fluid in a circuit or path where flow measurement is to be made. Streamlined brackets 47 and 48 are cast integrally with the end members 50 and 51, as are the electrical connection housings 54 and 55, annular fluid passageways, 56 and 57, being preserved between the brackets and the end members, and electrical connection passageways, 58 and 59, being provided between the interiors of the brackets and the ends of the connection housings.

The exterior of impeller 45 is of cylindrical configuration and has a diameter very slightly smaller than the internal diameter of the central portion 49 of the housing structure 44, such that substantially all of the fluid flow through the flowmeter unit must pass through the numerous thin longitudinal slots, 60, which are distributed near the periphery of the impeller at a uniform spaced radial distance from the longitudinal axis of the impeller. The downstream end of the impeller is closed, with the exception of these longitudinal slots, by the supporting end structure 61 which contains an annular channel 62 sealed by an annular plate 63 to increase the buoyancy of the impeller in the fluid and thereby to reduce the impeller weight which must be borne by the impeller rotatable bearing arrangement. One of the bearing elements for the impeller comprises the rotatable cylindrical sleeve bearing 64 which is affixed to the end structure 61, and the other comprises the cylindrical shaft 65 which extends through this sleeve and is fixedly held in a central position in a recess 66 in the upstream bracket 47. Shaft 65 also supports the rotor structure of a motor which drives the impeller 45 at a substantially constant speed. This rotor structure is shown to include the motor rotor member 67 mounted on a sleeve bearing 68 which has gear teeth 69 cut in an extension thereof. The stator structure of the constant speed motor is comprised of the annular laminations 70 and the annular coil arrangement 71 which is energized through leads 72 connected to a suitable electrical source through connector housing 54. Fluid is excluded from the motor stator structure by a thin cylindrical nonmagnetic seal 73 intermediate the rotor 67 and the stator laminations 70 and the heavier cylindrical seal 74 which is soldered to seal 73 at one end and threaded to bracket 47 at the other. Impeller 45 is rotated at a constant speed slower than that of the motor rotor 67 because of the speed reduction of gearing 75, intermediate gear teeth 69 and the gear 76 affixed to the impeller end structure 61.

The fluid entering upstream end member 50 is caused to flow in the annular passageway 56 surrounding bracket 47 and substantially all of this fluid must pass through the longitudinal slots 60 in the rotating impeller 45. In the manner previously described, each unit volume of fluid which leaves the downstream end of the impeller slots has had imparted to it a predetermined angular velocity and one linear speed about the axis of impeller rotation, and measurement of mass rate of fluid flow is accomplished by measurement of the angular deflection of the turbine 46 when this turbine reduces the angular velocity of the fluid to substantially zero. The construction of turbine 46 bears some resemblance to that of impeller 45 inasmuch as the external appearance is cylindrical, and the turbine is of the same diameter as the impeller, to minimize the flow between housing portion 49 and the outside of the turbine, and there are longitudinal slots 77 distributed near the periphery of the turbine. Additionally, the turbine is given buoyancy to a degree which will minimize the load thereof which must be supported by its bearings for the densities of fluid with which the flowmeter is designed to be utilized. This buoyancy is achieved by the closure of an annular channel 78 with a thin seal 79 soldered or otherwise suitably attached to the edges of the inner frame and hub member 80. The reduced turbine bearing load realized with this buoyancy makes possible the use of sensitive low-friction bearings to provide improved instrument accuracy and sensitivity. One of these sensitive bearings, 81, resiliently backed by a spring, is recessed into an end of shaft 65, and the other, 82, similarly resiliently backed, is recessed into an end of the central turbine shaft 83. Shaft 83 has a fine spindle 84 extending therefrom into bearing 81, and another fine spindle, 85, extends into bearing 82 from the central shaft 86 which is held in downstream bracket 48. Turbine 46 is thus permitted to move angularly about the longitudinal axis of the flowmeter unit, although this movement is restrained by the spiral spring 87 which is coupled at one end with turbine shaft 83 and at the other end with bracket 48. Slotted extension 88 from the hollow shaft 89 is slidable along the spring to vary the spring tension. Adjustment of the response of the turbine 46 may be accomplished by rotating the shaft 89 with a suitable tool, such as a screwdriver, to rotate slotted extension 88 and to vary the biasing effect of spring 87.

Impeller 45 is positioned with its downstream end close to the upstream end of turbine 46, but a thin stationary disk or separating member, 90, affixed to shaft 65, is neverthless interposed between all portions of these adjacent ends other than those portions from the inner edges of the slots to the outer edges of these cylinders. This separating member serves to reduce the viscous coupling between the impeller and turbine ends, which coupling would otherwise result when the instrument is filled with fluid and which would create turbine torques at zero flow, such torques of course being different with fluids of different viscosities and thus a source of errors. While viscous coupling exists between the impeller and the disk, it is of no significance because the constant speed motor torque overcomes it, and the viscous coupling between the turbine and the disk is likewise unimportant because the turbine is always driven to a stationary position against the force of the restraining spring 87. Whatever minute viscous coupling exists between the impeller and turbine is introduced through the annular opening left between the disk 90 and housing portion 49, but, if this small error is troublesome, it may be further reduced by lengthening the flow path between the turbine and impeller slots, as by leaving an annular space at the upstream end of the turbine just ahead of the slots therein. Viscosity effects introduced between the outside of the impeller and the inside of the housing portion 49 are inconsequential because the motor torque overcomes them, and the turbine is continuously driven to a stationary position where viscous coupling with the outer housing portion 49 is of no importance. These features of the mass rate flowmeter which render it substantially free of viscosity errors are of particular importance and significance.

Output indications of the flowmeter of Fig. 4, which are measurements of angular movements of the turbine 46 from its zero or neutral position in relation to the outer housing, are remotely indicated in the manner illustrated in Fig. 3. The position transmitter or pick-off of the angular motion transmitting system is shown, in Fig. 4, as a second harmonic type of unit comprising a rotor with permanent magnets 91, affixed to the turbine shaft 83, and a stator winding 92 surrounding an annular core 93. Electrical leads 94 are coupled with this winding 92, and are brought out to electrical connectors within the connector housing 55, through passageway 59. A fluid-tight annular chamber is formed between the downstream bracket 48 and the thin non-magnetic sealing member 95, which passes between the stator and rotor structures of the pick-off, to exclude fluid from the stator elements. For zero-setting purposes, the entire stator structure is made angularly movable in its support brackets 96 which are movable about their supporting surfaces in downstream bracket 48. To provide a readily accessible device for effecting this angular movement, one of the support brackets 96 is provided with an extension 97 having gear teeth which mesh with the gear 98 mounted for rotation with a shaft 99 within bracket 48 which extends to the outside of the end member 51 where it may be rotated by a screwdriver or other tool.

Output indications from the mass rate flowmeter which is the subject of this invention do not require corrective equipment in association therewith inasmuch as the turbine angular displacements are direct indications of mass rate of fluid flow. In this respect, there is a decided advantage over arrangements previously proposed and necessitating corrections for fluid density, viscosity, velocity, etc., because only simply-made measurement, that of turbine displacement, is required for presentation of complete and accurate mass rate flow information. Inherently, the flowmeter structure described possesses fail-safe characteristics, since the turbine and impeller slots are always open to permit unobstructed fluid flow therethrough even though power failure or mechanical failures should hamper or end proper operation of the turbine or impeller. This same feature, that of continuously open slots in a turbine and impeller, rather than restricted flow features of pressure-differential flowmeters, also permits the normal pressure drop across the mass rate flowmeter to be kept to a very small value. Because the impeller and turbine cylinders must be free to rotate within the flowmeter housing, some clearance must be provided between the outside of these cylinders and the inside of the housing. Fluid will of course be bypassed through the gaps resulting from such clearance, and this may occasion a certain amount of error. Too small a clearance may create an undue damping of the turbine response or increase the possibility of friction or binding between the parts of the turbine and impeller and housing as a consequence of bearing wear or contamination by particles carried by the fluid, and yet too large a clearance may intolerably increase the flowmeter error. A satisfactory solution is found in the design of a turbine and impeller of such length and with slots of such size that the pressure drop between these elements and the outer housing is large with respect to the pressure drop across the slots through these elements, whereby the high-pressure-drop gap path by-passed by the low-pressure-drop slot path in each element results in a minimum flow through each gap, and, therefore, a minimum error.

Other than for this error reduction purpose just noted, the design of the turbine and impeller slots is not particularly critical. While the same number and cross-sectional area of slots in both the turbine and impeller would very probably be utilized, in most structures, there is no absolute requirement for such design practice. For utmost sensitivity where flow of fluids of low density is to be measured, numerous slots of considerable length would appear to be desirable to insure that a uniform angular velocity is in fact imparted to all of the fluid by the impeller and that all of the angular momentum of the fluid is absorbed by the turbine. Length of the slots may be influenced by such factors as the expected range of rates of fluid flow, fluid density, the cross-sectional area of the slots to be used, and the speed at which the impeller is to be rotated. It should be apparent that such design features as number, length, cross-sectional area, radial position, and shape of the slots, and impeller speed, and other dimensions, are not peculiarly associated with the concepts embraced by the present invention, but that these are simply adopted in accordance with the characteristics of the fluids and fluid flows likely to be encountered by a particular mass rate flowmeter.

In actual tests of mass rate flowmeters constructed in accordance with these disclosures, it has been found that a unit with external dimensions of about 10 by 3⅜ inches easily and successfully accommodates fluid flow in the range of 0–9,000 pounds per hour, with fluids having specific gravities of from 0.697–0.82, and yields a substantially linear relationship between the deflection of the turbine from 0–270 degrees with flows from 0–9,000 pounds per hour. It has been further demonstrated by actual tests that the design of the turbine and impeller slots is in fact not particularly critical, substantially identical results being produced, for example, when either 16 or 32 slots are employed in the impeller and turbine, and when the slots are not closed on their outer peripheries, and when a circular and substantially rectangular cross-section of slots is employed, in flowmeters of the type illustrated in Figs. 1, 3, and 4. Tests performed using fluids of widely different viscosities and the same specific gravity have shown no significant differences with my mass rate flowmeter.

It is particularly noted that measurement of mass rate of fluid flow utilizing a turbine type means for providing a measurement responsive to the momentum lost by the fluid previously given a substantially uniform velocity of motion may be modified in several respects. For example, the turbine may be continuously driven to a predetermined null position at all times during operation of the flowmeter, a measurement being made of the power required to preserve this orientation or some function of this power. The power required by an electrical torque motor driving the turbine to the null position is indicative of the mass rate of fluid flow. It should be apparent, also, that any one mass rate flowmeter may be designed to have a number of operating speeds for the impeller unit thereof, to provide a plurality of ranges of indications and to insure satisfactory operation with fluids of different densities.

While particular embodiments of this invention have been shown and described herein, it will occur to those skilled in the art that various changes and modifications can be accomplished without departing either in spirit or scope from the invention as set forth in the appended claims.

I claim:

1. In a substantially linear fluid flow path, the flow measuring system comprising upstream impeller means angularly accelerating all of a fluid to substantially the same linear speed about an axis parallel with the directions of linear flow of said fluid in said flow path, motive means driving said impeller means at a substantially constant speed, movable means restrained and positioned downstream in said flow path in proximity with said impeller means in said flow path to reduce only the motion of said fluid imparted by said impeller, a viscous decoupling member supported stationary in said flow path between proximate portions of said impeller and restrained means other than portions thereof communicating flow of said fluid between said impeller and restrained means, and means measuring movements of said restrained means.

2. A mass rate flowmeter comprising a fluid-tight housing having a substantially cylindrical fluid chamber therein, means for coupling said chamber into a fluid flow path, a substantially cylindrical rotatable impeller within and substantially coaxial with said fluid chamber and having a plurality of thin fluid-conducting openings therethrough which are linear and parallel with the axis of rotation of said impeller at substantially the same spaced radial distance from said axis, means rotating said impeller at a substantially constant speed, a substantially cylindrical angularly movable turbine within and substantially coaxial with said chamber in a downstream relationship to said impeller and having a plurality of fluid-conducting openings therethrough which are linear and parallel with the axis of angular movement of said turbine, resilient means restraining angular movement of said turbine in relation to said housing, and means measuring the angular movement of said turbine in relation to said housing.

3. A mass rate flowmeter as set forth in claim 2 wherein the total cross-sectional area of said impeller openings and the total cross-sectional area of said turbine openings are large compared with the cross-sectional area of the spacings between said impeller and said chamber and between said turbine and said chamber, respectively, such that substantially all of the fluid flow through said housing is through said openings in said impeller and said turbine.

4. A mass rate fluid flowmeter comprising a fluid-tight housing having a substantially cylindrical fluid chamber therein, said chamber being adapted for coupling at both ends serially into a fluid flow path, a substantially cylindrical rotatable impeller within and coaxial with said chamber and having a plurality of thin fluid-conducting openings therethrough which are linear and parallel to the longitudinal axis of said impeller at substantially the same spaced radial distance from said axis, means supporting said impeller in said chamber for rotation about said longitudinal axis, means rotating said impeller at a substantially constant speed about said longitudinal axis, a substantially cylindrical angularly movable turbine within and substantially coaxial with said chamber and having the upstream end of said turbine in proximity with the downstream end of said impeller, said turbine having a plurality of fluid-conducting openings therethrough which are linear and parallel to the longitudinal axis of said turbine, means supporting said turbine in said chamber for angular movement about said longitudinal turbine axis, spring means coupled between said turbine and said housing to restrain angular movement between said turbine and said housing, and means measuring angular relationships between said turbine and said housing.

5. A mass rate fluid flowmeter as set forth in claim 4 wherein the outermost portions of said impeller and said turbine are separated from said chamber by small spacings which substantially block the flow of fluid therethrough, wherein said openings in said impeller are of a total cross-sectional area which affords flow of fluid therethrough with a low pressure drop and are each of length and cross-sectional area which determines that substantially all of the fluid emanating therefrom has a predetermined reduction in angular velocity of motion.

6. A mass rate fluid flowmeter as set forth in claim 4 wherein said impeller and turbine fluid-conducting openings comprise longitudinal open-ended slots at a uniform radial distance from the longitudinal axis of said chamber, and further comprising a stationary separating member positioned in said chamber intermediate the downstream end of said impeller and the upstream end of said turbine, said separating member being proportioned to permit unobstructed fluid flow directly between the slots in said impeller and the slots in said turbine.

7. A mass rate fluid flowmeter as set forth in claim 4 wherein said rotating means comprises a constant speed electric motor having a rotor structure supported within said chamber and coupled to drive said impeller and a stator structure supported by said housing, and wherein said measuring means comprises an electrical pick-off having a rotor within said chamber coupled for angular orientation by said turbine and a stator structure supported by said housing, and further comprising at least one remote electrical indicator actuated by said electrical pick-off.

8. A mass rate fluid flowmeter comprising a hollow generally-cylindrical fluid-tight housing having a fluid coupling at each end for coupling said housing into a fluid flow path, a streamlined upstream bracket supported within said housing near the upstream end thereof directing the flow of said fluid into an annular path between the outside of said bracket and the inside of said housing, a substantially constant-speed electric motor supported and housed within said bracket, a cylindrical impeller positioned closely within said housing with a downstream and proximate relationship to said bracket and having a plurality of longitudinal openings therethrough near the periphery thereof receiving said fluid from said annular path, means coupling said motor with said impeller to rotate said impeller at a substantially constant speed about the longitudinal axis thereof, an angularly movable cylindrical turbine positioned closely within said housing with a proximate downstream relationship to said impeller and having a plurality of longitudinal openings therethrough near the periphery thereof, at least one spiral spring coupled with said turbine and said housing restraining angular movement of said turbine with reference to said housing, and means measuring angular movements of said turbine with reference to said housing.

9. A mass rate flowmeter as set forth in claim 8 further comprising a downstream bracket supported within said housing near the downstream end thereof and supporting said turbine for angular movement within said housing, and wherein said measuring means comprises an electrical pickoff having one part positioned by said turbine and a second part within said downstream bracket and in a fluid-tight relationship with said downstream bracket.

10. A mass rate fluid flowmeter comprising a fluid-tight housing having a substantially cylindrical fluid chamber therein, said chamber being adapted for coupling at both ends with a fluid flow path, a substantially cylindrical rotatable impeller within and coaxial with said chamber and having a plurality of substantially longitudinal thin openings therethrough which are linear and parallel to the longitudinal axis of said impeller at substantially the same spaced radial distance from said axis, means supporting said impeller in said chamber for rotation about the longitudinal axis of said impeller, a motor rotating said impeller at a constant speed about said axis, a substantially cylindrical angularly movable turbine within and substantially coaxial with said chamber and having its upstream end in proximity with the downstream end of said impeller, said turbine having a plurality of substantially longitudinal fluid openings therethrough and having a hollow fluid-tight chamber therein increasing the buoyancy of said turbine in the fluid in said chamber, sensitive low-friction bearings supporting said turbine within said housing for angular movement about the longitudinal axis thereof, resilient restraining means coupled between said turbine and said housing to restrain angular movement between said turbine and said housing, and means measuring angular relationships between said turbine and said housing.

11. A mass rate flowmeter comprising a fluid-tight housing having a substantially cylindrical fluid flow chamber therein, a substantially cylindrical impeller within and coaxial with said chamber and having a plurality of thin fluid-conducting openings therethrough near the periphery thereof which are linear and parallel with the longitudinal axis of said impeller at substantially the same spaced radial distance from said axis, said impeller having a diameter only slightly less than the internal diameter of said chamber, means supporting said impeller in said chamber for rotation about said longitudinal axis, motive means rotating said impeller at a substantially constant angular velocity to impart substantially the same linear speed to all fluid passing through said impeller openings, a substantially cylindrical turbine collinear with said impeller within said chamber and having a plurality of fluid conducting openings therethrough near the periphery thereof which are linear and parallel with the longitudinal axis of said turbine, said turbine having a diameter only slightly less than the internal diameter of said chamber, means supporting said turbine in said chamber for angular movement about said longitudinal axis of said turbine, means yieldably opposing said angular movement of said turbine and measuring means responsive to angular movements of said turbine.

12. A mass rate flowmeter comprising a fluid-tight housing having a substantially cylindrical fluid flow chamber therein, a cylindrical impeller and a cylindrical turbine collinear within said chamber and coaxial with the longitudinal axis of said fluid chamber, said impeller and turbine fitting closely within said chamber and having relatively large longitudinal fluid flow passages near their peripheries at a uniform radial distance from said axis, said passages being linear and parallel with said axis, motive means rotating said impeller at a constant angular velocity about said axis to impart to all fluid passing therethrough substantially the same linear speed about said axis, means mounting said turbine for restrained angular movement about said axis, means yieldably opposing said angular movement of said turbine and measuring means responsive to angular movements of said turbine.

13. A mass rate of flow measuring system comprising a fluid-tight housing coupled into a fluid flow path, rotatable impeller means within said housing and having a plurality of fluid flow passages therethrough which are wholly linear and parallel with the axis of rotation of said impeller means at substantially the same radial distance from said axis, means rotating said impeller means about said axis at a uniform angular velocity whereby fluid flowing through said passages is accelerated to said uniform angular velocity and to substantially one linear speed about said axis, turbine means within said housing rotatable about said axis collinearly with said impeller means and having a plurality of fluid flow passages therethrough which are wholly linear and parallel with said axis, said impeller and turbine means being disposed to enable fluid which has passed through said impeller means passages to pass through said turbine means passages, means restraining angular movement of said turbine means about said axis, and means responsive to angular movements of said turbine means about said axis to measure mass rate of flow of said fluid.

References Cited in the file of this patent

UNITED STATES PATENTS

| | | |
|---|---|---|
| 720,188 | Seidener | Feb. 10, 1903 |
| 2,472,609 | Moore, Jr. | June 7, 1949 |
| 2,602,330 | Kollsman | July 8, 1952 |